(12) United States Patent
Shultz et al.

(10) Patent No.: US 11,084,412 B1
(45) Date of Patent: Aug. 10, 2021

(54) ENCLOSED, MOBILE EMERGENCY RESPONSE UNIT

(71) Applicant: Enviro-Safety Solutions Inc., Eaton, CO (US)

(72) Inventors: Adam B. Shultz, Eaton, CO (US); Robert D. Stringer, Severance, CO (US)

(73) Assignee: Enviro-Safety SolutionsInc., Eaton, CO (US)

( * ) Notice: Subject to any disclaimer, the term of this patent is extended or adjusted under 35 U.S.C. 154(b) by 0 days.

(21) Appl. No.: 17/157,018

(22) Filed: Jan. 25, 2021

Related U.S. Application Data

(60) Provisional application No. 62/983,395, filed on Feb. 28, 2020.

(51) Int. Cl.
| | |
|---|---|
| *B60P 3/00* | (2006.01) |
| *H02S 10/20* | (2014.01) |
| *H02S 10/40* | (2014.01) |
| *B60R 16/033* | (2006.01) |
| *B60R 15/02* | (2006.01) |

(Continued)

(52) U.S. Cl.
CPC ............... *B60P 3/00* (2013.01); *A47K 3/28* (2013.01); *A61H 35/02* (2013.01); *A62C 3/07* (2013.01); *B60P 1/435* (2013.01); *B60P 3/005* (2013.01); *B60R 15/02* (2013.01); *B60R 16/033* (2013.01); *B62D 63/068* (2013.01); *B62D 63/08* (2013.01); *B62D 65/02* (2013.01); *H02S 10/10* (2014.12); *H02S 10/20* (2014.12); *H02S 10/40* (2014.12);

(Continued)

(58) Field of Classification Search
CPC ......................................................... B60P 3/00
USPC .......................................................... 414/430
See application file for complete search history.

(56) References Cited

U.S. PATENT DOCUMENTS

| | | | | |
|---|---|---|---|---|
| 2010/0175736 A1* | 7/2010 | Reichart | ............... | H01M 10/48 136/244 |
| 2012/0248818 A1* | 10/2012 | Cochran | ................. | B60P 3/341 296/168 |

(Continued)

OTHER PUBLICATIONS

Author Not Indicated; "#wellsitesentry"; <https://twitter.com/hashtag/wellsitesentry?src=hashtag_click> (May 12, 2018, US).

(Continued)

*Primary Examiner* — Jerry D Robbins
(74) *Attorney, Agent, or Firm* — Wiedmann Law LLC

(57) ABSTRACT

Certain embodiments of the inventive technology may be described as an enclosed, mobile emergency response unit that comprises an enclosure and an underlying support frame on which the enclosure is established, where that enclosure may include a medical compartment that is unsecured when the enclosed, mobile emergency response unit is on operational standby, an onboard equipment compartment that is secured, when the enclosed, mobile emergency response unit is on operational standby, and a ramped, portable equipment compartment that is unsecured when the enclosed, mobile emergency response unit is on operational standby. Embodiments of the inventive technology may further include, e.g., a fire suppression system, a fueled electrical power generator, a compressor, a solar power system, medical equipment, wi-fi provision componentry and/or operational parameter monitors, among other componentry.

16 Claims, 6 Drawing Sheets

(51) Int. Cl.
   *B60P 1/43*   (2006.01)
   *B62D 63/06*  (2006.01)
   *B62D 63/08*  (2006.01)
   *B62D 65/02*  (2006.01)
   *A62C 3/07*   (2006.01)
   *A47K 3/28*   (2006.01)
   *A61H 35/02*  (2006.01)
   *H02S 10/10*  (2014.01)
   *H02J 7/35*   (2006.01)
   *H04W 76/10*  (2018.01)
   *H04W 84/12*  (2009.01)

(52) U.S. Cl.
   CPC .............. *H02J 7/35* (2013.01); *H04W 76/10* (2018.02); *H04W 84/12* (2013.01)

(56) References Cited

U.S. PATENT DOCUMENTS

| | | | | |
|---|---|---|---|---|
| 2013/0233575 A1* | 9/2013 | McCoy | ............... | A62C 27/00 |
| | | | | 169/24 |
| 2017/0180829 A1* | 6/2017 | Schwarzkopf | ........... | H04Q 9/00 |
| 2018/0175629 A1* | 6/2018 | Andrei | ................. | B60P 3/005 |
| 2018/0272164 A1* | 9/2018 | Knight | .................... | A62C 3/00 |

OTHER PUBLICATIONS

Author Not Indicated; "Onsite Emergency Response—CorroSource"; <https://www.facebook.com/corrosource/> (visited Jun. 15, 2021; publication date not indicated; US).

Author Not Indicated; "WellSiteSentry" <https://www.corrosource.com/about-us> (visited Jun. 15, 2021; publication date not indicated; US).

Author Not Indicated; "CorroSource—WellSiteSentry" <https://www.corrosource.com/new-wellsitesentry> (visited Jun. 15, 2021; publication date not indicated; US).

Author Not Indicated; "CorroSource—Onsite Emergency Response" <https://www.facebook.com/corrosource/videos/> (visited Jun. 15, 2021; publication date not indicated; US).

Author Not Indicated; "CorroSource—Transforming Wellsite Safety; WellSiteSentry"; <https://www.corrosource.com/>; (visited Jun. 15, 2021; publication date not indicated; US).

Author Not Indicated; "CorroSource—WellSiteSentry—About Us" <https://www.youtube.com/watch?v=qMdLVQFtl_Y> (Aug. 18, 2020; US).

* cited by examiner

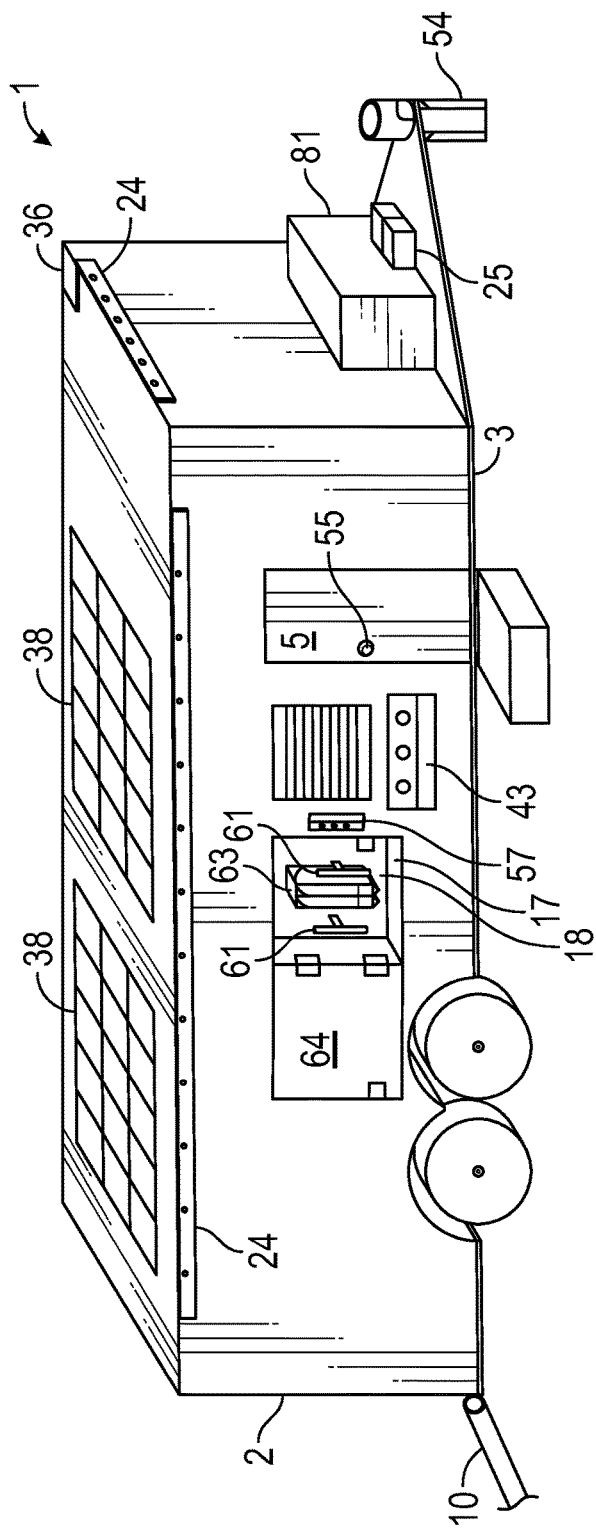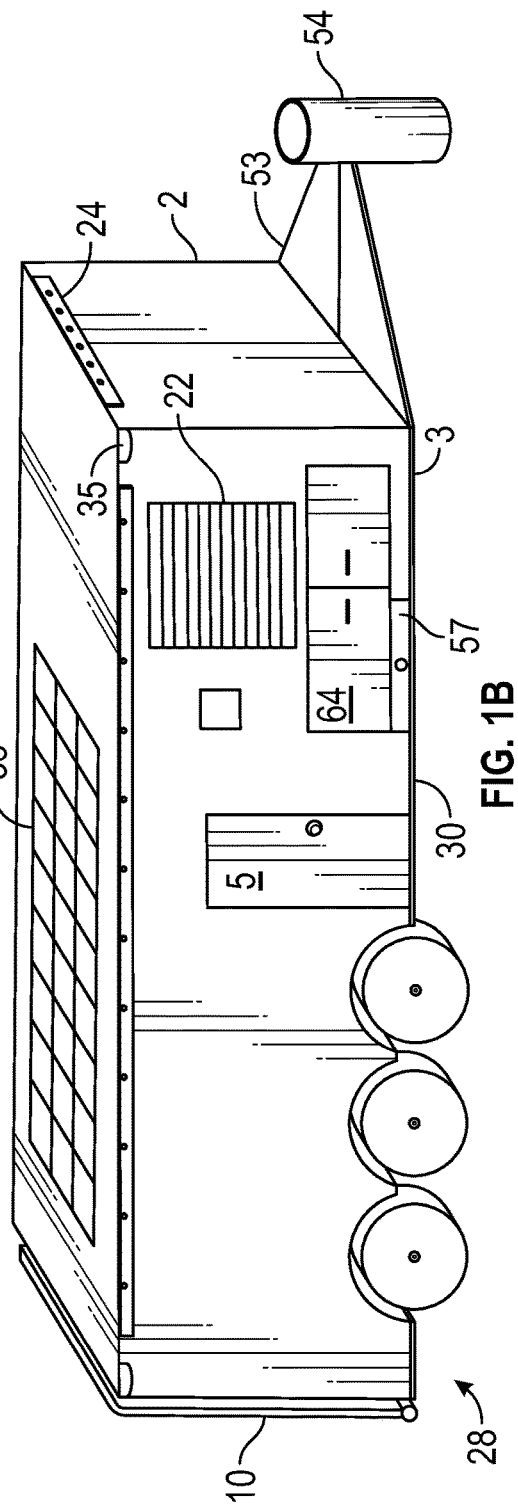
FIG. 1A
FIG. 1B

ENCLOSED, MOBILE EMERGENCY RESPONSE UNIT

CROSS REFERENCE TO RELATED APPLICATION

This US Non-provisional patent application claims priority to US provisional and benefit of application No. 62/983,395, filed Feb. 28, 2020, the provisional application incorporated herein in its entirety.

BACKGROUND

Fire suppression has long been an area of focused attention, but problems still persist at certain areas, like well (e.g., oil) fields. For example, fire suppression options available across all industry lines (i.e. oil field or construction sites, natural disaster areas, etc.) in some cases are either small, hand-held fire extinguishers or a call to the local fire department. But hand-held fire extinguishers are incapable of putting out a large, or certain type fire. And the response time of the local fire department, especially to an oil field site, which is often located miles from civilization, is far too long to ensure the safety of employees and the environment.

Hazardous waste cleanup has also been the focus of much effort, but problems still exist with it also. Current options for the removal of contaminated water/hazardous liquids (i.e. oil field/construction spills, hazardous fluid spills, flooding, etc.) include trucking services (i.e. pump trucks, water trucks, vac trucks, etc.) and/or the allowance of water recession. Trucking services present two main problems: a lengthy wait time and a steep expense. In the case of flooding, permitting water to recede naturally takes time and may lead to increased water damage.

The ability to provide medical attention on site, at an oil field or other site, has also be the focus of a certain degree of attention. However, existing oil field/construction trailers may house very de minimus safety related equipment, e.g. only a safety shower/eye wash station and first aid supplies. There is significant room for improved safety measures across all industry lines.

As such, and because of the dangerous nature of most oil and well field-related work environments, there is a need for a mobile enclosure, whether trailer or otherwise, that offers the ability to address certain fluid waste, fire, and medical-related conditions and emergencies. Particular embodiments of the inventive technology seek to do precisely that, and seek to do so in a manner that provides appropriate security to valuable equipment of certain emergency response systems that may be needed in any of a spill, fire or medical emergency to anyone onsite, while also providing reliable, continual, quick access to and control of such systems.

BRIEF SUMMARY OF EMBODIMENTS OF THE INVENTION

Certain embodiments of the inventive technology may be described as an enclosed, mobile emergency response unit that comprises an enclosure and an underlying support frame on which the enclosure is established. That enclosure may include a medical compartment that is unsecured when the enclosed, mobile emergency response unit is on operational standby, and may have medical compartment access door. There may also be an onboard equipment compartment that is secured when the enclosed, mobile emergency response unit is on operational standby, with an onboard equipment compartment access door that is secured at such time. Another compartment of the enclosure may be a ramped, portable equipment compartment that is configured to house portable equipment and that is unsecured when the enclosed, mobile emergency response unit is on operational standby. The compartments may be established, at least in part, via internal partitions within the enclosure that divide the enclosure into the various compartments. The enclosed, mobile emergency response unit further may also include a ramp configured so that the portable equipment can be moved up and down the ramp so that the portable equipment can be moved into and out of the ramped, portable equipment compartment; in certain embodiments the ramp may act as a door to the portable equipment compartment. The unit may further include a safety shower, automated external defibrillator, and first aid supplies established in the medical compartment, and a fire suppression system comprising onboard fire suppression equipment and fire suppression system control componentry. That onboard fire suppression equipment may be established in the onboard equipment compartment, and the fire suppression system control componentry may be established in an accessible area that is outside of the onboard equipment compartment and that is unsecured when the enclosed, mobile emergency response unit is in the operational standby. The fire suppression system control componentry may be in communication with the onboard fire suppression equipment, thereby allowing a human to operate (e.g., manually or otherwise adjust) such control componentry to control the fire suppression system. Note that the unit may also include a compressor; there may be provided compressor control componentry. The compressor is said to include control componentry when that control componentry is established in the same secured compartment as the other components of the compressor; otherwise, e.g., where the control componentry is established away from other compressor componentry, such as in an accessible configured space, the term compressor is said to exclude the compressor control componentry (e.g., on/off switch, adjustable pressure regulator, control valve(s)). As such, even where an embodiment is described as having a compressor in a certain area (e.g., in the secured onboard equipment compartment), control componentry for that compressor may be established in a different area. The unit may also include, e.g., ventilation componentry, a fueled electrical power generator, lights, a battery(ies), among other componentry.

Embodiments of the inventive technology may provide a readily useable emergency response unit for use on any type of jobsite (e.g., frac site, drill site, wellfield, etc.); advantages of certain embodiments of the inventive technology include the provision of ready access to emergency response systems (so that it can be used without delay during an emergency) without compromising security of certain equipment of such systems (protecting against theft and/or tampering thereof). Additional advantages of certain embodiments of the inventive technology include the integration of certain features/componentry together in a single unit; a mobile unit that that provides certain functionality while also being movable from one jobsite to another as needed; the provision of medical equipment (e.g., an AED), a fire suppression system, and a fluid compressor together in a single mobile unit; the provision of an electrical energy independent (energy self-sufficient, e.g., operable without needing to tap into grid power) mobile safety unit (e.g., due to solar and/or fuel power); and/or the provision of an electrical energy independent mobile safety, emergency response unit that also includes a fueled electrical power generator, in addition to, e.g., a compressor, a safety shower, etc. Other advantages and benefits of certain embodiments of the inventive technology may be as described herein, below.

BRIEF DESCRIPTION OF THE SEVERAL VIEWS OF THE DRAWING

FIG. 1A shows a perspective front view of an embodiment of the enclosed, mobile emergency response unit as may appear in at least one embodiment of the inventive technology.

FIG. 1B shows a perspective front view of an embodiment of the enclosed, mobile emergency response unit as may appear in at least one embodiment of the inventive technology.

Figure 2A:
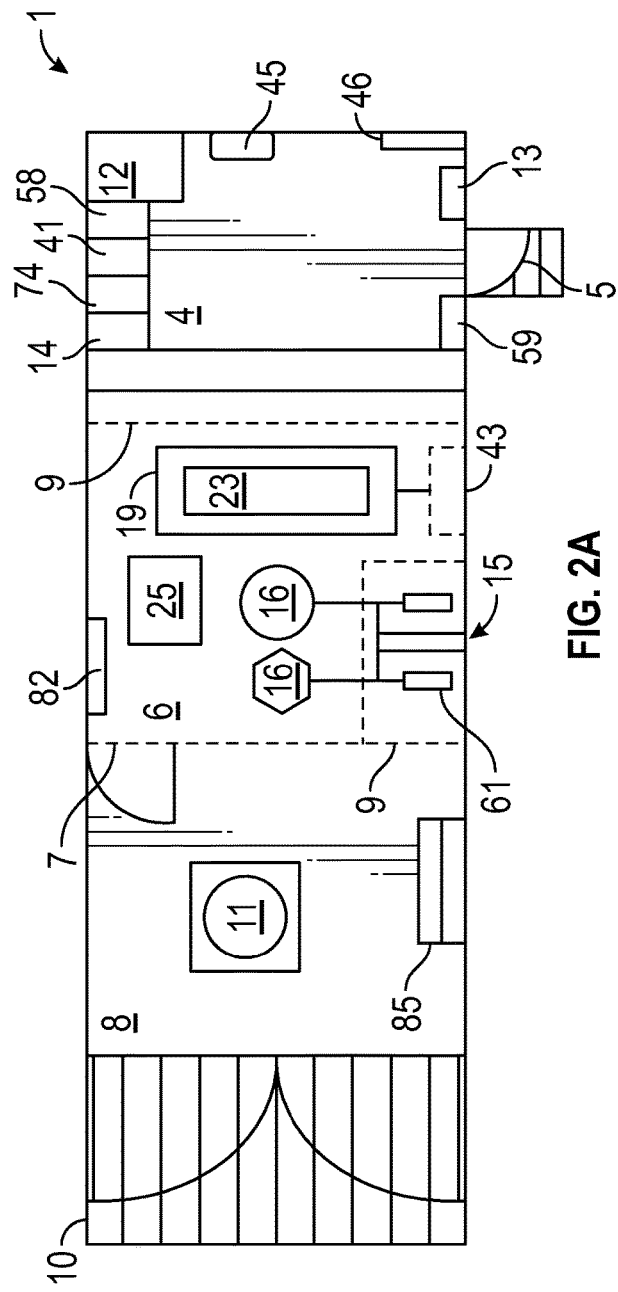
FIG. 2A shows a top view (with ceiling (roof) not shown in order to show enclosed contents) of an embodiment of the enclosed, mobile emergency response unit as may appear in at least one embodiment of the inventive technology. Here, as in FIGS. 2A, 3A and 3B, the ramp 10 is shown at the left of the figure via a rectangular component with lines along its travel direction.
Figure 2B:
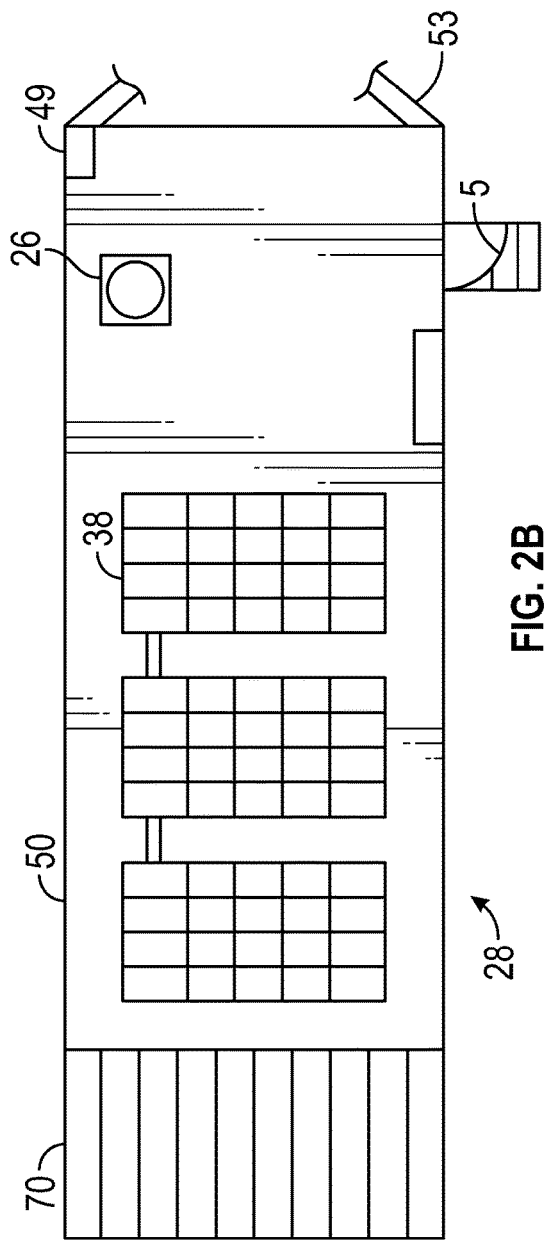
FIG. 2B shows a top view of an embodiment of the enclosed, mobile emergency response unit as may appear in at least one embodiment of the inventive technology.

Componentry that is, by itself, known (e.g., a generator) may, at certain times, be shown via black box type depiction in the drawings.

DETAILED DESCRIPTION OF VARIOUS EMBODIMENTS OF THE INVENTION

It should be understood that the present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Generally speaking, embodiments of the inventive technology aim to address and resolve deficiencies of known onsite safety technologies by providing an enclosed, mobile emergency response unit 1 that can be stored onsite (e.g., on a well field (e.g., oil field) or a construction site, as but two examples), and easily be used at a moment's notice to suppress a fire, remove excess or spilled water/liquids, provide emergency first aid supplies and medical care, and generally increase safety measures at that site. The invention, in certain embodiments, may be referred to informally as an enclosed, mobile emergency response unit (EMERU) 1 (of which certain embodiments may be referred to as a mobile emergency response trailer (MERT)) and may include much safety equipment and facilities, and ensure quick access thereto during emergent situations to anyone on-site (on the jobsite), without compromising important anti-theft/anti-tampering protections of equipment. The unit may be an assembly, where it has been assembled from various components (e.g., an underlying support frame, walls 50, fire suppression system 15, compressor 19, electrical system, etc.).

The EMERU (e.g., an enclosed assembly that provides ready access to emergency equipment and that is mobile in the sense that it can be moved from one site to another as required) can take many forms. It may have an enclosure 2 connected with and supported by an underlying support frame 3, which may be a mobile underlying support frame. If it is a mobile emergency response trailer, it may be an enclosed trailer (e.g., a wheeled or sleighed enclosed trailer) that includes a wheeled underlying support frame (e.g., a platform trailer) and that can be readily hitched to and towed behind a vehicle (e.g., a truck or a train car) over land in order for it to be moved from one site (where it is on operational standby) to another (so it can be on operational standby at that new site).

Note that the term trailer per se may have various meanings in the general industry of transportation (it can mean an enclosed towable storage trailer or a towable flatbed trailer, for example). As such, for clarity, instead of using that term alone, this description will seek to use either the term enclosed trailer (e.g., the mobile enclosure and the underlying platform trailer together) or platform trailer (e.g., an underlying towable platform trailer such as a wheeled platform trailer (or a sleighed, flyable or floating platform trailer) that serves as a mobile underlying support frame on which a load such as an enclosure can be affixed and transported), as appropriate (a platform can, in certain embodiments, include a continual surface, such as a fully planked surface, or even be a skeletal frame). Note that it is not the case that all EMERU's are trailers or have mobile underlying support frames, because some are only haulable (and not towable), such as EMERU's that, to be transported, must first be lifted, rolled, winched or craned onto beds of trucks (or rail cars, planes or ships) that then transport (haul) them to a new site (jobsite or storage location)

The EMERU can take a variety of additional forms: it can be an wheeled towable unit that can be towed overland from site to site, where it is placed on land for service on operational standby mode, and ready for quick translocation via towing when needed; it can be an haulable unit 31 (with an underlying support frame that is not mobile) that can be loaded onto a vehicle, e.g., a floating barge, plane, or a flatbed truck bed, including a roll off truck, via cable hoist, hook lift, rollers, etc., and hauled to a new jobsite, where it can then be unloaded from the vehicle and placed on land, perhaps on timbers or other support, perhaps on hard surface, where it can remain on operational standby; it may be a floating unit that can be towed or even piloted (via motorized propeller) from off shore drilling site (where it would be on operational standby) to another; it can even be an flyable unit in certain embodiments. Of course, regardless of the precise manner in which mobility is provided, the EMERU can also be moved from or to a non-operational storage location, or to a different location on the same jobsite, not just from jobsite (well or drill site, frac site, production well site, as but a few examples) to jobsite.

Certain embodiments of the unit are an assembly of various components. For example, as mentioned, certain embodiments are a full enclosure (perhaps with various compartments) installed over (and connected to and supported by) a mobile underlying support frame, such as a heavy duty deck-over towable platform trailer. As with any type of enclosed, mobile unit, it may be assembled, perhaps even custom built, and enclosed (e.g., fully or partially, with doors).

The enclosure of the unit may include internal partitions 9, e.g. internal walls, that form compartments (e.g., rooms), e.g., a medical compartment 4, a (secured) onboard (heavy) equipment compartment 6, and a ramped, portable equipment compartment 8 (in which portable equipment 11 may be stored). Certain compartments may be intentionally unsecured (e.g., via unlocked doors) when the EMERU is on operational standby. Unsecured when used in connection with a compartment implies that such compartment is readily accessible, without having to, e.g., unlock any locks 55, by all personnel on-site (on the jobsite) when the EMERU is on operational standby. Unsecured compartments may have access doors that may have locks that are unlocked when the EMERU is on operational standby, but perhaps locked at other times. Note that certain compartment(s) may be secured (e.g., locked) and not accessible to most personnel (and accessible only to certain personnel who have, e.g., a code, access card, key, etc.) when the EMERU is on operational standby. Each compartment may be human occupy-able in that a human can gain access to and remain in, at least temporarily, that compartment (even if "cramped" or uncomfortable).

Whether a compartment is referred to as secured or unsecured depends on whether it is kept inaccessible to unauthorized personnel (e.g., locked) during operational standby; even an unsecured compartment may have a lock (e.g., on a door), although such lock would be unlocked during operational standby. When the unit is in storage (i.e., not during operational standby or during an emergency), as where it is stored offsite in a warehouse or a storage yard, the unit, including every one of its compartments, may be fully secured.

As mentioned, the EMERU (enclosed, mobile emergency response unit) may be completely mobile (i.e. transportable via road, water, snow or air) so that it can be transported from one job site to another (e.g., spending several months at a first job site on operational standby, and then moved to a second jobsite for the next several months on operational standby, etc.) It may also be possible, in embodiments where the unit includes a mobile underlying support frame (that remains under and connected to the enclosure when the unit is on operational standby (e.g., at a jobsite)), that the unit may be quickly moved closer to the site of an emergency if needed, although it is expected that if it is placed in an appropriate location (e.g., centrally) on certain jobsites of limited areal space (e.g., a fracking site), it will be close enough to any emergency on that jobsite to provide safety/fire suppression/clean up functionality, without the need for relocation on that jobsite. At large sites, or sites that would benefit from more than one EMERU, more than one may be used.

The term EMERU, when it manifests as a mobile emergency response trailer (MERT) 28, which is an enclosed trailer, includes the mobile underlying support frame 29, such as wheeled platform trailer 30 (e.g., a custom-made towable, wheeled platform trailer or a commercially available towable platform trailer such as a heavy duty deck-over towable platform trailer). Embodiments that can be translocated only upon being rolled or hoisted onto (e.g., via truck winch/hoist or crane) a flatbed of a truck and then moved (hauled, not towed) while being atop the bed of that truck are not viewed as having wheeled underlying platforms and not viewed as trailers, although such units are still considered mobile (because they can be transported to a different location (e.g. from jobsite to jobsite), just like, e.g., a roll-off container).

In embodiments with a wheeled underlying support frame, that frame may be, e.g.: a wheeled deck-over dual tandem (towable load) platform trailer; a heavy duty deck-over towable platform trailer, a wheeled platform generally, a road wheeled platform and/or a rail wheeled platform (for transport via railroad or other rail). Certain embodiments of the wheeled underlying support frame may include any of a variety of componentry, e.g., at least one axle 33, metal structural components such as frame with, e.g., I-beams and perhaps cross-members, tongue 53, a hitch, hoist 54, wheels, hubs, and perhaps a deck, inter alia. Embodiments without such a wheeled underlying platform may include, e.g., sleighed (perhaps with runners, for traveling on snow) platform, a boat hull, or know plane features allowing transport of the entire unit via air. Depending on customer need, the mobile unit can also be entirely enclosed, or only partially enclosed, either with some access door(s); in some less common embodiments it may be fully exposed.

As mentioned, certain embodiments of the EMERU involve a full enclosure over a heavy duty deck-over (towable load) trailer, together manifesting as a mobile emergency response trailer that is fully enclosed (see, e.g., FIGS. 1A and 1B); such embodiments may be the first such incorporation of such technologies. Certain "sub" embodiments of such unit incorporate a (towable load) trailer that has axles (e.g., tandem 10,000-lb. axles or triple 8,000 lb. axles) and a heavy-duty I-beam frame; together with the enclosure such frame supports they form a trailer that is capable of securely housing a variety of heavy and other equipment in one compact (but likely compartmented), convenient space. Note that instead of such specific axle design, more and/or different axles may be used. Of course, the platform trailer of such enclosed trailers may include other components (e.g., a tongue, a hitch, cross-members, frame generally, wheels, tires, etc.), as may be found with certain known platform trailers.

Note that the only enclosed deck-over trailers currently on the market are designed to enclose and tow recreational vehicles such as snow mobiles. Most enclosed trailers, used to tow vehicles for example, are not deck-over because they need to be close to the ground and require less weight capacity.

As mentioned, in certain embodiments, the unit's enclosure may be divided into at least three main compartments via two or more partitions (e.g., a front partition and a rear partition); certain embodiments use those two partitions to create three compartments (a front compartment that is, e.g., closest to a trailer hitch (or more generally, at the opposite end of a ramped compartment), a middle compartment, and a rear compartment, perhaps accessible via a ramp 10 that one can perhaps walk and roll equipment along when deployed). Note that reference to a partition as front or rear does not imply necessarily that the partition is entirely vertical, or entirely orthogonal to the long axis of the trailer (although certainly this may be the case). Note that in certain embodiments, a partition may be oriented in any fashion (e.g., even be entirely parallel with the forward direction of the unit) to create at least two compartments, some that may each have a width that is less than the full width of the unit, a height that is less than the entire height of the enclosure's interior at the site of the partition, could be other than rectangular or square, etc. All compartments may have a (human) access door that allows for entry of a human therethrough.

Note that the unit is viewed as in use during operational standby (because in such mode, even though perhaps certain of its safety systems (e.g., fire suppression system 15) are not in use, such systems are reliably fit and immediately ready for functional use (i.e., it is ready for actual use, e.g., charged or readily chargeable by power or pressure, to, e.g., douse a fire), and any control componentry of such system(s) that require direct human interfacing (e.g., manipulation to activate and operate the fire suppression system) during any of the various possible emergency situations (e.g., fire, flooding, medical emergency, spill, etc.) is readily accessible (e.g., it is in an unsecured compartment or in an accessible area (e.g. a space) that is accessible from outside of the secured onboard equipment compartment, and in certain embodiments, from outside of the entire enclosure). Because such control componentry is readily accessible, there is no risk of delay or non-entry associated with, e.g., having to, e.g., unlock a lock or enter a code (non-entry could occur if one cannot find the key, or lost or cannot recall a code). The accessible area may be outside of the onboard equipment compartment and on the outside of the enclosure (although in certain embodiments it may be outside of the onboard equipment compartment but in a different compartment that is unsecured when the EMERU is on operational standby (e.g., in the medical compartment)). That accessible area may be, e.g., a flat panel 56 (whether substantially in the same plane as an enclosure wall or partition in which it is established, covered or not), a space (e.g., a configured space inset into an enclosure wall, partition), or other.

Note that, when the unit is in storage (e.g., off of a jobsite) or being transported from or to a jobsite, it is not viewed as in use. Note that when the unit is not in use (not on operational standby or not in emergency), all doors may be locked and all covers (for accessible areas with control componentry for emergency response systems that may, depending on the type of emergency, require human interfacing during an emergency) with locks are locked, to prevent theft, unauthorized use, tampering, and/or unintentional opening. Of further note is the fact that, when the unit is on operational standby, there may still be use of certain equipment (e.g., the compressor (for compressed air provision to certain parts of the jobsite), the electrical system (e.g., for lighting, charging, etc.) and/or the portable equipment (e.g., for pumping of fluids in a non-emergent situation)).

The current invention, in at least one embodiment, may include, in addition to first aid equipment such as first aid kit(s), a life-saving defibrillator (e.g., AED) as well as an array of personal protection equipment/safety consumables all in one easily accessible location (e.g., a medical compartment that is unsecured when the EMERU is on operational standby); certain embodiments may also include onboard heavy machinery in a different compartment, and portable equipment (e.g., a water pump and hoses therefor) that is perhaps in yet another compartment. Of note is the fact that in certain embodiments, onboard heavy equipment (e.g., the onboard fire suppression equipment 16, the compressor 19, and perhaps the generator (perhaps other than its control componentry)) is established substantially over the axles of the underlying support frame (establishing such components in the middle compartment may be one way of achieving this).

In certain embodiments, one compartment (any compartment, but typically a front compartment or rear compartment) of the unit may house primarily medical equipment with which human interfacing (e.g., direct manual access) may be needed during a medical emergency; such compartment may typically (during operational standby) be unsecured (although still securable via lock) so that it is readily accessible via an access door 5 when the unit is on operational standby (similarly to, perhaps, the ramped compartment, if indeed that is a different compartment). The medical compartment, like a ramped, portable equipment compartment that may exist, may be lockable, but left unlocked during operational standby (so as to prevent delay in access to equipment housed in such compartment(s) during an emergency); as such, such compartments may be referred to as unsecured (during operational standby).

The EMERU (and more particularly, in certain embodiments, its medical compartment) may contain a wide variety of medical equipment and safety supplies. Work essentials (e.g., hand tools) may be stored in the medical compartment also and/or in the ramped compartment. Examples of medical equipment and safety supplies include an automated external defibrillator 13, first aid supplies 14 (kits, etc.), a safety shower 12, eye wash station, personal protection equipment/safety consumables (i.e. hard hats, safety glasses, gloves, harnesses, etc.). Examples of work essentials include extension cords and small hand tools (i.e. hammer, wrench, screwdriver, tape measure, etc.). All of these items may be available for use by on-site workers. Any of these items may be housed in the medical compartment; certain items may be stored in cabinets/drawers in the medical compartment; such cabinets may, but need not, be floor to ceiling. There may be provided counterspace, in certain embodiments. A heater, and perhaps also air conditioning can be provided for the medical compartment (or any other compartment, e.g., any other unsecured compartment) via, e.g., a heater or AC system, or a heat pump system 58 such as a mini-split.

Note that there may be provided a tank for wastewater 42 (e.g., water from the safety shower and eye wash station); it may be located, e.g., in the medical compartment, or under the underlying platform, perhaps below the medical compartment. There may also be provided a water supply (e.g., freshwater) tank 41 for the water for the safety shower/eye wash station. If that freshwater tank is pumped, that tank may be provided virtually anywhere on the unit (but it may make most sense for it to be situated in or near the medical compartment to conserve tubing costs and minimize pump size); if the safety shower/eye wash station is instead gravity-fed, then the freshwater tank should be located sufficiently high above the safety shower/eye wash station outlets to provide sufficient flow at the outlets. Note that it may be best to situate a gravity feed tank at least a certain height (e.g., 9') above the floor of the unit (e.g., of the medical compartment), which may mean that the height of the medical compartment or perhaps even the entire unit is at least a slightly higher height (e.g., at least 9¼', such as 10') than it might be otherwise, or that the gravity feed tank is established on the roof of the unit (where solar panels may also be located). Note that in some embodiments there may be provided a drain to the exterior of the unit so that fluids leaked or spilled within the unit drain to outside of the unit; certain embodiments may include a trough along the inside of the enclosure in order to, e.g., facilitate collection of liquid (e.g., spilled liquid) and disposal thereof.

Note that a control center 59 (e.g., a cabinet or panel with certain electrical control componentry such as lighting, communications, compressor control componentry 21, general solar, etc., control componentry), to which regular access may be desired, perhaps even by any personnel on the jobsite, so any personnel in the immediate vicinity can take action in an emergency, e.g., turn on lighting, activate a siren, make an emergency announcement) may be provided in, e.g., either the medical compartment or the portable equipment compartment.

A second compartment (any compartment, e.g., a middle compartment or front compartment), may be referred to as a secured onboard equipment compartment (it may be an onboard mechanical equipment room); it may have a door 7 that is kept locked (secured) when the unit is on operational standby and may house emergency system equipment (e.g., equipment such as a compressor, fueled electrical power generator 23 (e.g., mechanical parts such as engine (other than generator control componentry)), onboard fire suppression equipment (e.g., fire suppression material tanks 40) of the fire suppression system) with which human interfacing (e.g., to which direct, manual access) is not typically needed during any of the various emergency situations (no need to get inside the onboard equipment compartment and physically contact the equipment therein to operate and control the system that such is a part of during that emergency); such equipment may also be particularly valuable (e.g., certain heavy equipment) and as such benefits from secure storage when the unit is on operational standby. Onboard may imply that the referenced equipment is intended for long-term housing in the unit, and is not intended for removal from the unit or its compartment(s) during an emergency (i.e., it remains in the compartment not only during operational standby, but also during an emergency). Such onboard equipment may, in certain embodiments, be fastened to the unit and/or may be larger than a human access door that allows access to the compartment, making theft or tampering thereof particularly difficult. Equipment in the secured onboard equipment compartment may be equipment with which human interfacing (e.g., to which direct manual access) is not needed during an emergency (whatever emergency that may be). Note that the secured onboard equipment compartment may, in certain embodiments, include only equipment (e.g., compressor, generator (perhaps other than its control componentry), fire suppression tanks 40) that is not interfaced during an emergency, whether such equipment be non-medical or otherwise.

In particular embodiments, the onboard equipment compartment may be referred to as a secured onboard equipment compartment that is secured (locked), even when the unit is on operational standby mode, but unlockable and accessible via an access door that is in the rear and/or front partition, or possibly even in the side of the unit (note that as to unit embodiments for which the forward direction is not entirely obvious (because, e.g., they may roll offs that can be transported on a flatbed truck while facing in any direction), the rear of the unit is deemed to be where the ramp is). An access door, as the term is used herein, allows human access to a space intended for temporary occupancy by one or more humans (even where, as may be the case with the onboard equipment compartment, which is viewed as a space intended for such occupancy, such occupancy may be cramped and uncomfortable, and perhaps just enough to allow for in-situ repair on such equipment by a repairman).

That access door (of the secured onboard equipment compartment) may be used so that, e.g., upon unlocking (via either key, code, QR code, bar code, wireless access, keyless entry, sensor recognition (e.g., iris, fingerprint), etc.), a human can enter the compartment and, e.g., make repairs to the onboard equipment housed in the onboard equipment compartment. The onboard equipment compartment may be accessible from inside the trailer (e.g., from the rear compartment of the trailer or the front compartment of the trailer) via a secured door (e.g., locked) established in any rear partition and/or front partition, or via a door that, instead of in a partition, is in one of the walls, ceiling or floor of the unit, and thus allows access directly from outside of the unit.

Note that the access door to the onboard equipment compartment is considered secured even where it is without a conventional lock, but is locked by, e.g., being fastened shut instead, and is openable only via, e.g., removal of fasteners (e.g., screws). In certain embodiments there may be a large openable panel portion(s) 84 in the unit sidewall (e.g., the left or right wall of the unit) that may function as a door(s); when opened (whether via removal, or rotation at, e.g., an upper horizontal axis such as a hinge, or at a lower horizontal axis such as a hinge), it may allow access to the secured onboard equipment compartment (see, e.g., FIGS. 5A and 5B). Such may be instead of or in addition to any smaller sized access door(s) to such compartment. Note that such type of outer unit wall door may have inset into it covered accessible area (e.g., a covered configured space) that house emergency system control componentry that communicates with the onboard equipment (such areas described further below).

A middle compartment may be the secured onboard equipment compartment and may house, e.g., the twin agent fire suppression system tanks and compressor. In certain embodiments, it may also house a fueled electrical power generator (perhaps other than generator control componentry), battery(ies) (powered by, e.g., solar power system 37 and/or generator), solar power controller(s), inverter (solar panel electronics), and/or a water tank/pump for the safety shower/eye wash station (where the shower and station housed in the medical compartment), perhaps fillable from, e.g., outside of the unit. As mentioned, this compartment may be secured at all times, perhaps accessible through a locked human access door (whether in a partition or through an external wall, ceiling or floor). Any human access door to any compartment that is through an external wall may have foldable stairs below it.

The onboard equipment compartment may securely house, e.g., valuable heavy equipment (perhaps typically, but not necessarily, non-medical equipment) such as onboard fire suppression equipment and a fluid (e.g., air or other fluid) compressor (which term may include any compressor pump, engine, etc.), as but a few examples, but perhaps not house certain control componentry that very well may need to be interfaced by a human (e.g., manually manipulated) during an emergency (e.g., fire suppression system control componentry 17, compressor control componentry and/or generator control componentry). Such onboard equipment (housed in the (secured) onboard equipment compartment) may act "behind the scenes" as critical support to control componentry associated with and in communication with (e.g., electronically, fluidically, physically, wirelessly, etc.) such onboard equipment; control componentry includes that componentry that may need to be directly manually operated, without delay (as may be caused by a locked door) during an emergency (e.g., fire suppression hoses, fire suppression system activation handles, compressor lines, etc.), depending on the nature of the emergency.

The EMERU may include a fire suppression system (typically, its secured onboard equipment compartment would house the system's pressurized fire suppression material tanks (including any compressed fluid, e.g., compressed N gas tank(s)). The system may be a commercial grade and self-contained fire suppression system. This system may, in certain embodiments, contain twin agent AFFF foam and/or dry powder capable of suppressing a large-scale fire; accordingly, it may be a twin agent fire suppression system 39. Either or both agents may be "powered" by, e.g., compressed nitrogen, which can quick-charge the system upon operation of pull handle(s) 61 (a type of fire suppression system control) that are established outside of the secured onboard equipment compartment and are readily accessible. The foam system may be a preferred first-to-use system, with the dry powder system forming a supplemental, backup or alternate system for extreme fires. Note that while the fire suppression system may be "internally" charged (e.g., via nitrogen), in certain embodiments it may instead be pressurized by the compressor, which is also in the onboard equipment compartment.

Ventilation componentry 22 (passive vents, fans, vented fans, etc.) may be configured (sized, designed, located, etc.) to vent any compartment, e.g., the onboard equipment compartment. Ventilation to any compartment may be allowed for or facilitated by vents to outside of the unit and perhaps even one or more fans (either alone or together referred to as ventilation componentry). Such may provide for airflow that helps to prevent overheating of, e.g., equipment, including but not limited to onboard equipment. Certain embodiments involve the use of passive ventilation (e.g., vents (vented openings allowing for airflow therethrough); others may instead or in addition involve the use of active (forced air) ventilation (vent(s) and fan(s)). In some embodiments, one or more compartment(s) may have passive ventilation while another one or more compartments may have active ventilation. Vents may be of any of a variety of sizes and can be placed anywhere, e.g., in the ceiling (e.g., via roof vent fan(s)), in any door(s), in walls, etc. Any active ventilation may involve fans (whether 12V, 36", or otherwise) that may or may not be combined with vents in the same device (e.g., vented fans such as but not limited to roof or wall mount exhaust/intake fans).

Of course, during operational standby or during an emergency, if a door is locked, it may cause an undesired delay or even prevention of access to critical emergency equipment established in that secured compartment by personnel in the area of the EMERU at the time of the emergency; such delay or inability to access that equipment could compromise the emergency response and increase the risk to individuals and property. As such, the control componentry of the systems that have certain equipment housed in the secured onboard equipment compartment (e.g., equipment such as tanks housing compressed fire suppression material of the fire suppression system, and compressor (including perhaps compressor componentry other than compressor control componentry) and that require human interfacing (i.e., direct human interfacing such as manual contact, to, e.g., start, stop, adjust operation of the onboard equipment) during any of the various emergent situations that may occur, may be housed outside of the secured onboard equipment compartment. Such componentry, referred to as emergency system control componentry, may be in communication with the onboard equipment (whether mechanically (e.g., via a manual valve and piping), fluidically, electrically, wirelessly, etc.), and thereby enable control of systems that such onboard equipment is also a part of (fire suppression system, compressor, perhaps the electrical system, at least in part). Fire suppression system control componentry is that componentry (one or more manually operable part) that, in the event of a jobsite emergency, may be interfaced by a human in some manner (activation handle(s), hose(s), valve(s), on switches, etc.), depending on the nature of the emergency. Such emergency system control componentry, instead of being established in the secured onboard equipment compartment, is instead established outside of that compartment. The emergency system control componentry generally (e.g., used to, e.g., activate and adjust, the secured onboard equipment that is also a part of that system) may communicate with the secured onboard equipment in any of several ways: electrically, analog, wireless, wired, mechanically (e.g., as a vale), sonically, etc. As such, some sort of direct manipulation of the emergency system control componentry can cause a change to the condition of the secured onboard equipment (e.g., change in pressure, flow status, etc.) so as to adjust operation of the system to which such componentry and equipment relate (e.g., to turn on fire suppression system, change pressure of compressor, turn off generator, etc.).

Fire suppression system control componentry may include, e.g., activation control componentry such as handles(s), perhaps for each different fire suppression agent, control valve(s), switches, dials, switches, hoses, hose attachment componentry, and/or terminals that, in the event of a fire, may, depending on the exact nature of the fire emergency, require human interfacing by any personnel in the area in order to use the fire suppression system to suppress a fire. Such control componentry may be established outside of the secured onboard equipment compartment, in, e.g., an unsecured accessible area, so a human (e.g., personnel, e.g., employee nearby) can quickly operate (e.g., control operation of, start operation, adjust operation, stop operation, etc.) the fire suppression system, during an emergent situation, without having to access the secured onboard equipment compartment in which the rest of the fire suppression system (generally, onboard fire suppression equipment such as compressed fire suppression material tanks) may be established. The emergency system control componentry may be accessed from outside of the onboard equipment compartment (and as such, the onboard equipment compartment can remain secure, i.e., locked, during operational standby (and indeed, during an emergency)). The entire system to which the secured onboard equipment and the emergency system control componentry that allows control of the entire fire suppression system, or the compressor, may be said to be established in the onboard equipment compartment and outside of it (e.g., in accessible spaces inset into the unit's walls), because certain system componentry is in a secured onboard equipment compartment while other componentry of that same system is outside of that compartment. Control componentry may be used via manual manipulation, whether of a valve, a wireless or wired transmitter, handle(s), switch(es), visual access (e.g., observance of a readout (e.g., a pressure readout)), as but a few examples.

Emergency system control componentry generally may include, e.g., fire suppression system activation control componentry, regulated compressor pressure control componentry, compressor feed line open and close valves, pressure dials, terminals such as outlets (e.g., compressed air outlet(s) 62, pressurized fire suppression material outlet(s), electrical outlet(s)), power sockets, electrical sockets, compressed air line sockets, outlets, equipment control componentry, valve handles, sensor readouts, equipment status dials, fire suppression hoses 63, outlets for hoses stored in the secured onboard equipment compartment, pressurized fire suppression material outlet(s), etc.; such may be established outside of the (secured) onboard equipment compartment. Such may be grouped into one or more sets (e.g., a set of fire suppression system control componentry, a set of electrical terminals (e.g., power socket, information communication socket), a set of compressor control componentry and/or status readouts (e.g., a pressure readout such as a dial or LED display)). Such componentry, whether organized into sets or not, may be established on or in an external wall of the trailer; typically, they are located in one or more accessible areas(s) (e.g., a panel, or an inset space, such as an inset box type space). That space may, in certain embodiments, be not substantially larger than that space required to house such componentry (and such space is not intended for occupancy by a human). Emergency system control componentry in that accessible area (e.g., space) may be protected (e.g., from the elements) via an openable cover 64 (of covered accessible areas) that can be opened (whether via hinges, sliding, removal, etc.) in order to provide manual and/or visual access to such space and componentry in it. Such cover may be unlocked so that the space that it covers is indeed unsecured during operational standby (thus allowing ready access to anyone in the area during an emergency).

There may be provided, e.g.: an accessible area 18 (e.g., a space) that houses fire suppression system control componentry (e.g., activation handles, valves, hoses (whether spooled, reeled, or otherwise, even where a majority of the hose is stored in the onboard fire equipment compartment)); an accessible area 43 (such as a space) that houses compressor control componentry; an accessible area 44 (e.g., a space) that houses generator control componentry; an accessible area (e.g., a space) that houses electrical system control componentry 59; an accessible area (e.g., a space) that houses electrical system and compressor control componentry; and an accessible area (e.g., a space) that houses compressor control componentry and fire suppression system control componentry and/or electrical system control componentry. It is possible that emergency system control componentry requiring human interfacing during any of the various emergent situations is combined in one or a few accessible areas. Note that an accessible area that houses generator control componentry may be established outside of the secured onboard equipment area (e.g., in the medical compartment); that same accessible area may also house lighting control componentry. Covered accessible areas that house emergency system control componentry (whether such is/are usable to operate equipment that is housed in the secured onboard equipment compartment or not) can be grouped/organized according to the system that they control (e.g., fire suppression system vs. compressor), and perhaps even marked accordingly. There may be provided a covered accessible area 27 that houses fire suppression system control componentry; there may be other covered areas that house other control componentry.

Note that the term cover is used herein to indicate that, unlike a (human) access door (which allows entry of a human into a space intended for occupancy, even temporarily, by a human), it (the cover) does not provide access to a space intended for occupancy by a human, even where the opening to that space (covered by the cover) is big enough to allow for human passage therethrough. Generally, a cover may allow access to an accessible area that houses control componentry that, during an emergency, may need to be interfaced by a human (e.g., directly manually contacted (i.e. control componentry, valves, hoses, air manifolds, etc.)) in order to operate equipment in the secured onboard equipment compartment, while also preventing full access to that onboard equipment itself, to prevent tampering/theft (e.g., during operational standby). A cover may take any of a variety of forms: a raised flap, double doors (not human access doors), sliding door or window, hinged panel, as but a few examples; it may be unsecured when the unit is on operational standby.

Another compartment, whether a third of three or more compartments or otherwise, may be, e.g., a rear compartment and may be configured with a ramp. In certain embodiments, it may be referred to as a ramped, portable equipment compartment. In certain embodiments, it may be configured (e.g., designed, sized) to house portable equipment (that is possibly heavy), and such equipment may benefit from a ramp for movement from the trailer such that portable equipment (e.g., a fluid pump that is portable (e.g., it can be wheeled closer to, e.g., a hazardous spill site) may be moved from that compartment down the ramp, and then closer to the site of an emergency, or moved so that it can be connected to other equipment that is either moved from or not located in that third compartment. This compartment, like a medical compartment that may exist, may be lockable, but left unlocked during operational standby (so as to prevent delay in access to equipment in such compartment(s)); as such, it may be referred to as unsecured when the unit is on operational standby.

The rear compartment is typically the ramped compartment (whether it be the portable equipment compartment, or the portable equipment compartment and the medical compartment): it may be accessible from outside of the trailer via at least one access door, e.g., two doors at the rear of the unit that swing outwards about two vertical hinges (one on a rear right of the unit, and one on a rear left of the unit), a door on right and/or left side walls of the EMERU, or a ramp that acts as an access door (of one or more than one access doors to that compartment). Note that there can be more than one access door for the portable equipment compartment, or indeed any compartment. A compartment that is directly accessible via a ramp (even where there is also a door or double door in the same area as the ramp (e.g., at the top of the ramp when deployed)) may be referred to as a ramped compartment (where such compartment is also a portable equipment compartment, it may still be referred to as a ramped compartment, or, more specifically, a ramped portable equipment compartment).

The ramp may be configured (e.g., built, assembled, constructed, sized, designed, attached, etc.) in a variety of ways so that the portable equipment can be moved up and down the ramp so that the portable equipment can be moved into and out of the ramped, portable equipment compartment. In certain embodiments, the ramp may rotate about a horizontal hinge established at or near the bottom edge of the rear of the unit and, in certain embodiments, may be established at the rear of the trailer. Or it may be established at the side of the trailer (right or left side), whether at the rear of the trailer or not). The ramp may be established outside of the portable equipment compartment. In embodiments where there is a ramp and a separate door (e.g., at the very rear of the unit), the ramp may be established rearward of the door(s) to the portable equipment compartment (where, to gain access to the compartment, the ramp would first be deployed (lowered), and then the doors would be opened), or forward of the rear door(s) (where, to gain access to the compartment, the doors would first be opened, then the ramp deployed). In yet other embodiments, the ramp may act as an access door to the portable equipment compartment and the deployment alone of such ramp may allow access to the ramped compartment (and in such embodiments, that ramp is also an access door). In certain embodiments, where the ramp is at the rear (whether at the very rear or at a rear side of the EMERU) and also acts as a door 70 then it may only be necessary to deploy (e.g., lower) the ramp to obtain access to the ramped compartment (see, e.g., FIGS. 2B, 3B, 5A and 5B). In any embodiment, of course, if there is provided another door (on the right or left side of the unit), or in/through the ramp, then for a human to obtain access to the rear compartment, it may only be necessary to enter that side door (or instead enter the deployed ramp (and any door at the top of that ramp that may exist)).

A portable equipment compartment, which is typically ramped, may house any portable equipment, e.g., a portable fluid pump 80 (e.g., a pneumatic pump) and, perhaps also all associated hoses 85. The portable pump (e.g., waste pump) can be easily removed from the portable equipment compartment (via the ramp) and transported around the job site, in order to, e.g., pumping water or any other fluid waste (i.e. liquid chemicals, oil, etc.). The pump can be used for, e.g., either spill cleanup and/or fluid transfer generally. The pump portion of the portable pump may sit atop or in a cart with, e.g., wheels that can be wheeled out of and back into the compartment via the ramp (FIG. 5A (rear perspective view)).

In certain embodiments, the portable pump may be secured in the rear section with a latching stability system 71 designed specifically for travel to prevent movement of the portable pump during travel of the unit. The latching stability system for the pump can be, e.g., a lever system in the floor that when latched will push some wheel chocks up out of the floor to keep the portable pump stable, from moving while being transported. When first arriving on location, and setting up for operational standby, one may push the lever to the open position so that the pump can easily be removed from the compartment at any time.

Figure 5A:
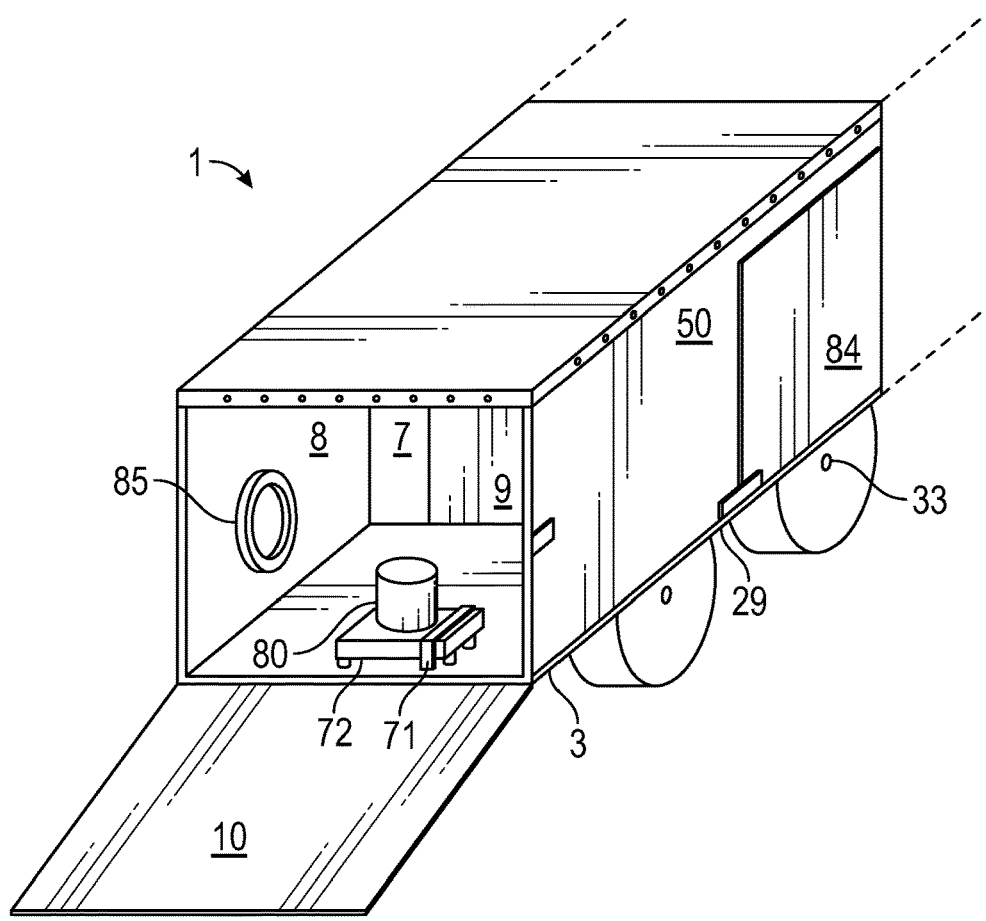
FIG. 5A shows a perspective rear view of an embodiment of a rear portion of the enclosed, mobile emergency response unit as may appear in at least one embodiment of the inventive technology.
Figure 5B:
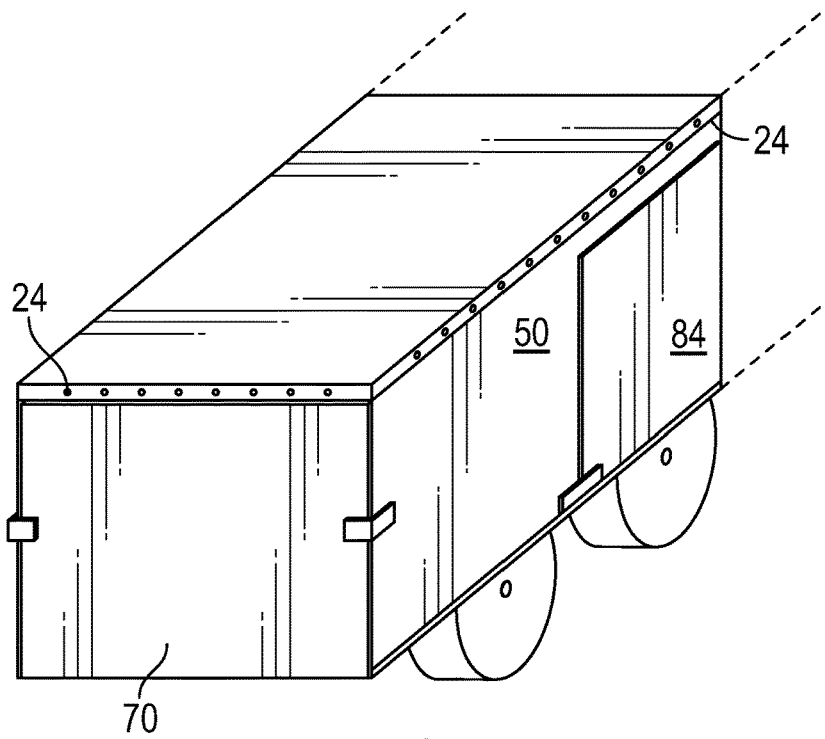
FIG. 5B shows a perspective front view of an embodiment of a rear portion of the enclosed, mobile emergency response unit as may appear in at least one embodiment of the inventive technology.

The portable pump (e.g., a portable waste pump) may include liquid pump componentry (e.g., casing, tubing, impeller, etc.) mounted on a heavy-duty cart 72 (e.g., custom built). The portable pump may be a portable liquid pump (that pumps liquid such as, e.g., wastewater, spilled fluid, oil, hazardous fluid, etc.) Any type of portable liquid pump may be used: compressed fluid (e.g., a pneumatic pump); fuel (e.g., diesel or gasoline); electric (whether powered by, e.g., battery on board the portable pump, fueled generator, battery on the unit, and/or by power via a cord extending from the enclosed, mobile emergency response unit), etc. FIG. 5A depicts an embodiment of the portable pneumatic pump and its custom cart as may appear in certain embodiments. The cart frame may be specifically designed with heavy duty wheels for rolling through rough terrain as well as lugs to allow the cart to be lifted by field equipment when and if necessary. If the pump is a compressed fluid (e.g., air) pump, such as a pneumatic pump, a compressed fluid line may extend from an on-board air compressor as it is moved closer to a spill or flood site so as to "power" the pump at its remote location in any of several ways. For example, the compressed fluid line may be connected to the compressor via a quick connect hose coupling fitting terminal in the rear partition and spool out (whether it is stored in the onboard equipment compartment or the portable equipment compartment) as the pump is moved to the spill/flood site, or extend from some compressed air line quick connect house coupling fitting terminal in a covered space on the exterior of a wall of the unit's, and extend to the pump to where it is moved on the job site (closer to the spill, for example).

In embodiments where the enclosed, mobile emergency response unit has three compartments, the ramped compartment may be the ideal location for heavy portable equipment (e.g., a portable pump) and in most embodiments may house such equipment; it may be the rear compartment, although this is not necessarily a requirement. In units with at least three compartments, a middle compartment may be, e.g., either the secured onboard equipment compartment or may instead be the medical compartment. Note that the secured onboard equipment compartment, regardless of where it is, may include, e.g., compressed fire suppression material tank(s), and a compressor, and possibly also a generator, inter alia. A front compartment may be either the medical compartment or instead the secured onboard equipment compartment. In embodiments with two compartments, there may be a secured onboard equipment compartment (with onboard, likely valuable, equipment housed therein that functions to provide critical "behind the scenes" support for emergency services, but to which direct manual access is not needed during an emergency) and an unsecured compartment (housing equipment to which direct access is needed during an emergency, such as medical equipment and portable equipment such as a portable pump). As mentioned, it may be preferred to establish heavy onboard equipment (e.g., compressor and fire suppression equipment tanks, and possibly generator) atop the axles of the unit (if indeed it has axles, as may be the case if the unit is a trailer); such may require that the onboard equipment compartment is the middle compartment.

Note that any compartment may house equipment that is in addition to and different from any equipment that might be suggested by its name (e.g., the medical compartment may, in addition to medical equipment, house handheld non-medical tools). Further, in certain embodiments, the medical compartment and the heavy portable equipment compartment may be the same physical compartment (and even in such embodiments, the emergency response unit may be the to have a medical compartment and a portable equipment compartment (they would just be the same compartment)); embodiments where they are not the same compartment may refer to them as distinct compartments. Where medical and portable equipment are segregated in two distinct compartments, such should help significantly in keeping the medical compartment clean. In those designs where the medical compartment and the portable equipment compartment are the same compartment, that compartment is typically the ramped compartment, and typically the rear compartment.

When the unit is on operational standby, human access doors to the portable equipment compartment and the medical compartment may be left unlocked, as may covered accessible areas housing emergency system control componentry, so any personnel onsite can access them quickly and readily. Also, during operational standby, the ramp may be left in deployed mode (i.e., not in stored, e.g., vertical mode), although this is not a necessity for ramps that are easy to deploy from their stored mode (regardless of whether the ramp acts as a door, as when its deployment allows entry to the rear compartment, or not). When the unit is on operational standby, as well as when it is in emergency mode, the unit is considered in an "in use" or functioning mode. When not on operational standby, e.g., when being transported or in storage, the unit may be the to be in storage mode.

Note that, as mentioned above, all access doors may be lockable, but only a certain door(s) should be locked when the emergency response unit is on operational standby, i.e., sits onsite, ready for use in an emergent situation (an emergency, including but not limited to a fire, a medical emergency, a hazardous spill, etc.) The only access door(s) that is typically locked while the emergency response unit sits onsite on operational standby may be the access door(s) to the (secured) onboard equipment compartment that may house the more valuable onboard equipment (e.g., non-portable equipment to which direct manual contact access during an emergency is not needed, e.g., certain compressor equipment and certain fire suppression equipment), to prevent theft of such equipment. Such compartment may be referred to as a secured compartment (e.g., it may be locked or otherwise not easily accessed when the unit is on operational standby). Other doors may be left unlocked during standby operation of the unit, to not impede, not delay, and not prevent human access to the compartment to which they lead (e.g., the medical equipment compartment, and the portable equipment compartment to which direct manual access may be needed in an emergency) in the event of an emergency. Covers may also be left unlocked, although the term unsecured, particularly with regard to covers, does not necessarily imply the existence of a lock that is left unlocked (during operational standby) . . . perhaps an unsecured cover has no lock whatsoever (so unsecured may be lockable or not lockable).

Additional features of the EMERU may be a generator and/or solar panels 38 used to power (including start, pressurize, otherwise control/regulate, charge, etc.): internal and external lighting 24 (such as but not limited to LED lighting), a compressor, electrical tools, a charging station, batteries, and mobile hot spot equipment, the fire suppression system (where needed), the generator (e.g., to start the generator), as but a few examples. These components may make the trailer extremely energy efficient as well as completely self-sufficient. The inventive response unit may, in embodiments, provide mobile and instant plug-in power, via power outlets 57 that are accessible internally and/or externally of the unit's enclosure. Such outlets can be accessed by the customer for a wide variety of uses, the most obvious being plug and go use of all types of power tools that may be required on the job site (as mentioned, there may also be provided compressed air outlets for pneumatic tools). Power, whether solar or from a fueled electrical power generator, from stored energy such as electrical battery(ies) 25, or from other source (e.g., solar, wind), can be used to power any power consuming devices and equipment, provide outlet power, and/or charge batteries. One important use of power is a charging station (providing power to air monitors, H2S monitors, laptops, cell phones, etc.). Ensuring a sufficient (e.g., full) charge to these devices at all times may be important for the detection, response to and/or reporting of an emergent situation (i.e. accident, bodily injury, chemical spill, gas leak, fire, etc.).

Figure 3A:
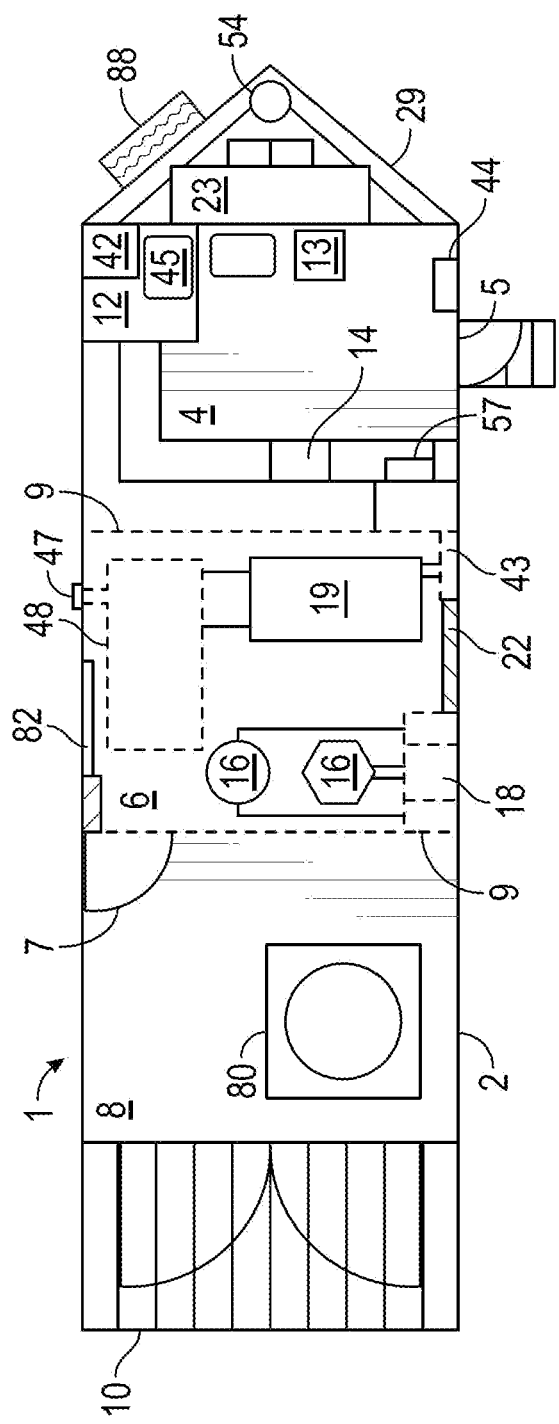
FIG. 3A shows a top view (with ceiling (roof) not shown in order to show enclosed contents) of an embodiment of the enclosed, mobile emergency response unit as may appear in at least one embodiment of the inventive technology.
Figure 3B:
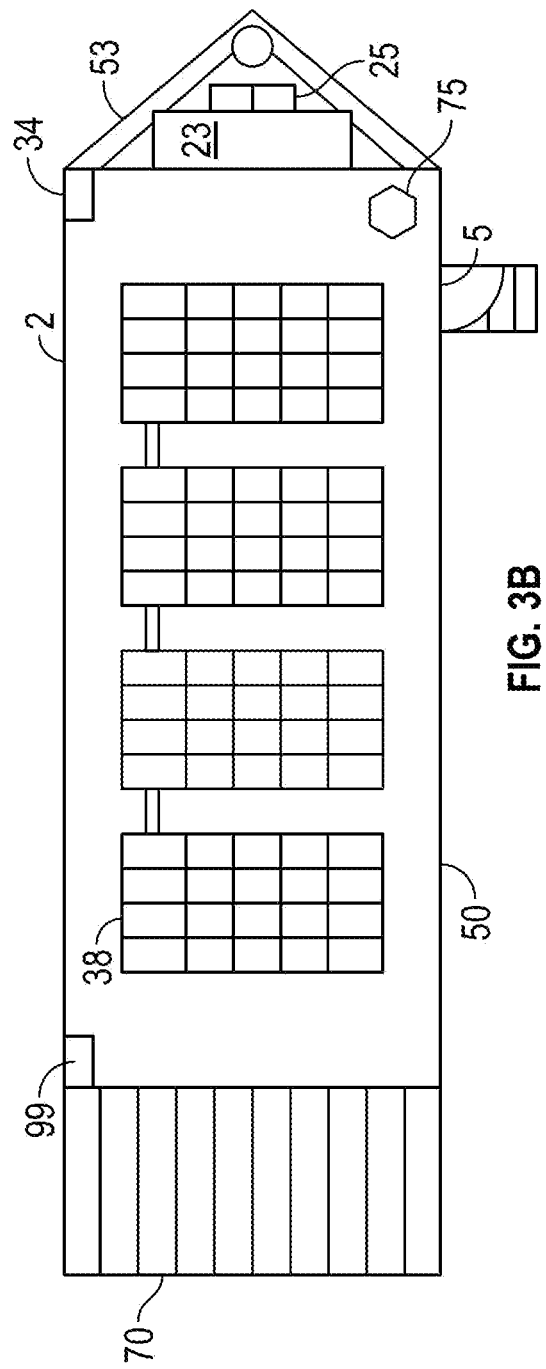
FIG. 3B shows a top view of an embodiment of the enclosed, mobile emergency response unit as may appear in at least one embodiment of the inventive technology.
Figure 4:
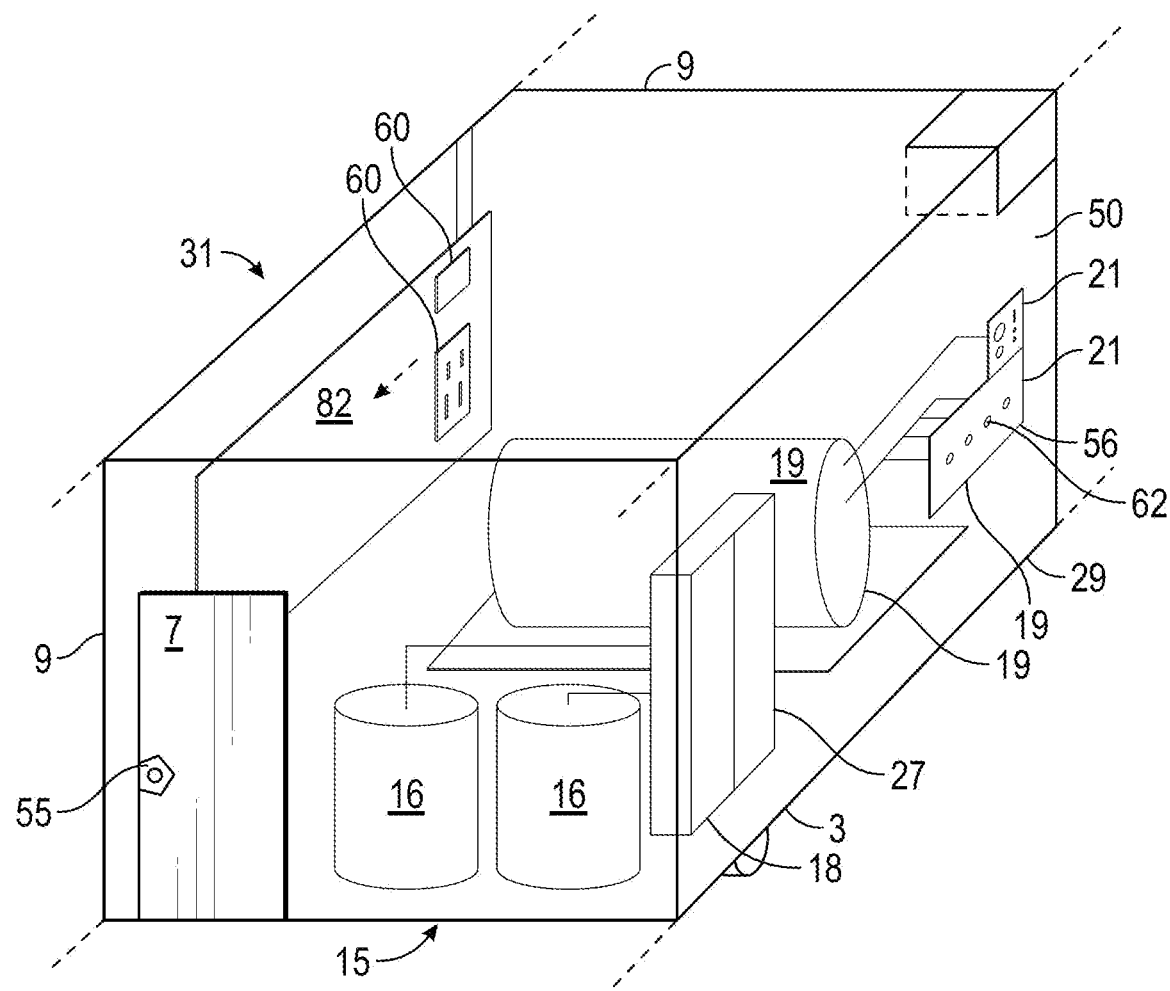
FIG. 4 shows a perspective rear view of the onboard equipment compartment of the enclosed, mobile emergency response unit as may appear in at least one embodiment of the inventive technology (the arrow on part 82 indicates that componentry 60 may be repeated on part 82).

A fueled electrical power generator may be used to perform one or more of the following: power all electronics, including lights, whether internal and/or external of the unit; power and charge battery(ies); power electrical equipment; inter alia. Such generator, which includes all components thereof other than generator control componentry when such control componentry is not established in the same compartment or housing as is the "non-control componentry" (e.g., the generator's engine, alternator, etc.), may be established anywhere on the unit, e.g., in any compartment, at the front of the unit (e.g., outside of a compartment, in a protective housing 81 for the generator, supported by a tongue of an underlying support frame of the unit), perhaps in a protective covering that shields it from the environment and perhaps secured against theft, or perhaps in the onboard equipment compartment, as but a few examples. It may be established in fixed relation to an underlying support frame of the unit. It may be, e.g., a fuel (e.g., hydrocarbon fuel, such as but not limited to diesel) powered generator, e.g. a fueled electrical power generator. In certain embodiments, battery power may be used to start the generator. There may be provided generator control componentry (e.g., a control panel) that can be established, e.g., in an accessible area (accessible from outside of the onboard equipment compartment). Either wall of the unit (e.g., the driver side) may have a fuel port 47 for fueling a fuel tank 48 for equipment such, e.g., as the generator, and possibly even a compressor (FIGS. 2A, 3A and 4). In certain embodiments, the generator may be secured, e.g., locked, either in its own secured housing, cabled or otherwise attached (via a lock) to the unit's structure in some fashion, or established anywhere in the secured onboard equipment compartment (e.g., stacked atop the compressor, in certain embodiments). Even where an embodiment is described as having a generator in a certain area (e.g., in the secured onboard equipment compartment), control componentry for that generator may be established in a different area, as may the tank of fuel that fuels that generator. In certain embodiments, direct manual access to generator control componentry of a generator is desired during an emergency, while also securing the generator (more particularly those parts that do not require human interfacing to control (operation of) the generator) against theft; this may be accomplished via, e.g., housing the generator (other than generator control componentry), in the secured onboard equipment compartment. Alternatively this could be established by housing the generator and its control componentry in an unsecured compartment and providing anti-theft fasteners that attach the generator to the structure of the unit, or cable locks that lock the generator to the unit or its structure, or locking the generator (other than control componentry therefor) in a housing (e.g., a steel housing). Note that such general secure design approach may be used with a wide variety of equipment/componentry to which direct manual access is desired during an emergency but where it is also desired to prevent theft. A viable strategy, as mentioned, may be to secure certain componentry of a system (with which direct manual contact is not needed during an emergency) in a secured onboard equipment compartment, and provide ready access to control componentry (that may control an emergency system such as the fire suppression system, the generator and/or the compressor) by placing such componentry in an unsecured accessible area.

Any battery(ies) may be used to start heavy equipment (e.g., diesel powered equipment such as perhaps a compressor and/or generator), power any equipment (e.g., a hoist that may exist at the front of the unit, at the tongue of the platform of the unit), store solar or fuel generated power, store electrical power generally, power lights, power electronics, power any electronic or electrical equipment, power fan(s), inter alia. The battery(ies), in certain embodiments, may be charged, e.g., via solar and/or a generator. Battery (ies) can be established in one or more locations virtually anywhere on the unit, e.g., near a generator that may exist fore of the unit, near a hitch/hoist, on the tongue of the underlying support frame, in the onboard equipment compartment, under the unit of the platform supporting it, as but a few examples. Battery(ies) can be secured, e.g., in their own secured housing, if desired. The battery(ies), in certain embodiments, can be continually supplying power to certain monitor(s), and can be, e.g., renewable, deep cycle, sustainable and/or green energy battery(ies); in certain embodiments, they are lithium, e.g., lithium iron phosphate batteries (e.g., as supplied by Battle Born™).

Known safety trailers lack, among other things, the ability to provide power and adequate lighting to the job site. The inventive EMERU may, in embodiments, provide such lighting, and provide power to the job site via internal and/or external power outlets. It may also provide adequate lighting to some or all of its compartments.

Solar panels 38 may be located on the roof, e.g., directly above the middle compartment, as but one example. Lighting may be located along the top of one or more, or all sides (e.g., all four sides) of the unit (FIGS. 1A and 1B) or at one or more locations on the unit. Lighting 24 may be powered via solar and/or a battery. Lighting can be, e.g., strip lighting (e.g., LED lighting along one or more strips along an exterior of the unit, such as an upper side edge, upper front edge, upper rear edge as shown in FIGS. 1A, 1B, 2A, 2B, 5A and 5B), spot lighting (e.g., lighting established atop a tower 99, perhaps extendable (from a lowered position to a raised, deployed position) from a side or from atop the unit) that can provide spot, flood or other lighting to a jobsite), among taking other forms. The emergency response unit may have the capability of providing high quality lighting to the job site all night long via both the generator and/or batteries (which may be charged via multiple solar panels and/or the fueled generator). Lighting can also be provided during the day (perhaps with a generator, batteries and/or solar panels). Providing lighting may save the customer the expense of a light plant rental.

In addition to power and lighting, the emergency response unit may also contain wi-fi provision componentry 26, e.g., a router and modem, satellite internet based internet provision componentry, etc., making the unit a true mobile hot spot, providing any service (e.g., 4G LTE or 5G or other) signal on all carriers and wi-fi for the entire job site. This can also be critical for timely communication in an emergent situation in addition to the increase in standard business communication associated with a jobsite that may be operational 24 hours a day. The mobile hot spot may also allow the trailer itself to be smart, e.g., communicate with the equipment maintainer, signaling its own GPS coordinates as well as the presence of an emergency, the need for maintenance of any equipment (e.g., every few months, or after a certain amount of operational time), etc. This feature alone makes it unlike anything else available on the market today.

In certain embodiments, as mentioned, the unit may incorporate wifi provision componentry and act as a wifi site; if it is in too remote a location for this, then an antenna may be raised on the roof (whether automatically or otherwise), allowing for the use of, e.g., 5G or LTE, and/or the wifi provision componentry may be componentry that achieves other internet connectivity such as fixed wireless, satellite internet and/or satellite based communication, etc. Certain embodiments will be able to provide cell service and wifi to everyone on location via the wireless fidelity provisional componentry. Note that there may be provided cameras (security, fire detection, etc.) and/or certain other monitors on the unit, so a wifi network may be necessary, in certain embodiments, so that the cameras (or other monitors) can be accessed by anyone with a password anywhere they may be (even offsite). Continual cell service provided to all areas in the jobsite will allow anyone to call 911 at any point in time, anywhere on the jobsite.

The inventive technology, in its various embodiments, may improve safety in one (e.g., onsite fire suppression capability) if not more areas (e.g., fire suppression, hazardous fluid transfer, and medical services); certain embodiments may provide a smart system that, via an operational monitoring and communication system 34 that monitors and communicates a parameter (e.g., its value) to a unit operator, provides a more reliable and effective onsite safety system.

The unit may include features that make it "smart" in that it may, via operational parameter monitor(s) 35, continually, electronically monitor certain parameters, e.g., any of the following parameters: battery charge, the pressure in the fire suppression system, temperature, solar power system condition, solar panel condition (e.g., cleanliness), the total operational time of any of the equipment (e.g., the compressor), the level of water in the tank for the safety shower/eye wash station (the eyewash station 45 may, in certain embodiments be established within an shower enclosure, although the two may instead be separate units (perhaps from the same water source)), fuel levels, solar system functionality, battery condition, and/or presence of fire onsite, etc. More particularly, there may be provided an operational monitoring and communication system that comprises at least one operational parameter monitor 35 that monitors at least one operational parameter selected from the group consisting of battery charge, solar panel condition, fire suppression system pressure, and equipment operational time, and communication componentry 36 that communicates the at least one operational parameter to at least one unit operator. Communication componentry may communicate a monitored operational parameter (e.g., its current value, its historical value, its relative value, whether it is too high, too low, etc.) to at least one unit operator (a jobsite supervisor, as but one example) so that appropriate action can be taken (e.g., cleaning, recharging, lubrication, regular maintenance, repair of equipment, etc.). Communicating can include even merely making information related to that parameter (e.g., a current value) available to an individual. This may be accomplished in any of several ways—well known monitors, bluetooth, wifi, wired componentry, etc.; communication may be to a display in a compartment (e.g., an unsecured compartment), to a cell phone, etc. The communication componentry may, in certain embodiments, include automatic action componentry (e.g., automatic notification componentry 74) that automatically takes action (e.g., provides a notification to a unit operator via automatic notification componentry) in the event an operational parameter monitor detects equipment requiring attention (e.g., the solar panels are dirty, battery is low, the generator needs lubrication, some type of intervention is appropriate, including repair, maintenance, replacement, recharge, refueling, lubrication, cleaning, updating, recharging the fire suppression system, adding water to the safety shower/eye wash station tank, add fuel, replace battery, recharge battery, provide regular maintenance, clean solar panel, etc.). In certain embodiments, the unit will also be smart enough to know if the fire suppression system is activated and be able to call 911 automatically, upon such activation, perhaps upon providing GPS coordinates. Any of the "smart" features (monitoring, communication, automatic action, automatic notification, etc.) may be provided in virtually any single one or more areas of the unit (with monitors often placed in strategic sites depending on what they monitor), and may use known or foreseeable technologies.

Fire detection cameras 49 (a type of monitor) are not currently used on job sites, as they would be of questionable value without a fire suppression system to accompany them. These cameras, as used in certain embodiments of the inventive technology, can detect even a small spark and alert those on the job site to initiate the fire suppression system as quickly as possible, and call 911. Perhaps an automatic 911 call is also, or instead, placed upon activation of the fire suppression system. As such, the fire detection cameras could be a part of an operational monitoring and communication system. This has the potential to prevent a serious fire from even happening, as workers can deploy the fire suppression system before the fire ignites or becomes serious. As such, fire detection cameras may be established anywhere on the jobsite, e.g., attached to the unit externally, e.g., higher up on the unit, as on its roof or its roof's edge(s). Regardless of where they are established, the cameras may be in communication, whether wirelessly or otherwise, with componentry on the unit, such that a fire may automatically create an alarm and/or contact 911 and/or personnel on the jobsite. Note that the cameras, like any componentry other than any portable equipment (when it is not temporarily affixed to the unit), can be established in fixed relation to the unit while at the same time being a part of the unit.

FIGS. 2A and 3A depict an overhead view of an embodiment of the EMERU. As mentioned, and as shown in such figures, the unit, in embodiments, may be divided into three compartments. The front compartment, located directly behind the hitch, may be the medical room. Completely encased and separate from the remainder of the unit, this "room" may bold all tangible goods (medical and safety supplies, and work essentials) stored in built-in upper and lower cabinetry as well as the safety shower/eye wash station. In certain embodiments, there may be a charging station 46 located along, e.g., interior wall (or possibly located on the outside of the unit), containing power outlets above a countertop that runs the width of the trailer. One upper cabinet may hold mobile hot spot equipment. Access to this space may be through an access door (human entry door) and foldable stairs located on either side of the unit, e.g., the passenger side of the trailer (FIG. 1A, depicting a view from the passenger side).

Additional safety components may be included, perhaps standard or perhaps upon customer request. Examples of these additional safety features could include an air quality monitor 75 and/or, as mentioned, fire detection cameras. Air quality monitors are rarely used on oil field and construction job sites at this time. Some sites located in environmentally focused societies have started putting them onsite to appease local residents/government. Having these monitors as an addition to the emergency response unit, is an affordable way to ensure the public that the customer is making all attempts to maintain an environmentally safe work environment. Note that there may also be provided a spare tire 88, vents/fans in, e.g., the ceiling, interior (and, as mentioned, exterior) lighting.

Note that any compartment of the unit (e.g., the secured onboard equipment compartment) may house solar power system electronics 60 (e.g., charge controller, solar controller, inverter, etc.); in certain embodiments, components of such electronics to which frequent access (e.g., regularly, such as daily) or emergency access is not needed may be established in the secured onboard equipment compartment. Indeed, any electronics (e.g., fuses, regulators, buses, etc.) to which frequent or emergency access is not needed may be established in the secured onboard equipment compartment, perhaps on a panel 82. In certain embodiments, certain electrical control componentry with which a human may regularly interface (e.g., lighting control componentry, certain solar panel control componentry, certain parameter readouts, etc.) may be housed in at least one control center that is located in either or both of the medical compartment or the portable equipment compartment (generally, in a compartment that is unsecured during operational standby). Any accessible area, whether in an unsecured compartment or in an accessible area, may include compressor control componentry. In at least one embodiment, one or more accessible area(s) located in an unsecured compartment (e.g., the medical compartment, unsecured during operation standby) can include control componentry for one or more of: lighting, compressor, generator. In certain embodiments, controls for the solar power system may be provided in the onboard equipment compartment, and/or an accessible area located in, e.g., a compartment that is unsecured when the unit is on operational standby (e.g., medical compartment or ramped portable equipment compartment).

There is no product currently available that provides certain or even all of the features listed above assembled together in a unit, as is seen in at least one embodiment of the inventive technology. Having a mobile unit on a job site with the capability to suppress fire, clean up a spill, ensure the safety of all those on the job site and increase communication/productivity will save the customer time, energy and money, and mitigate risk, damage and injury. Note that any features and componentry indicated herein may be combined in a single mobile unit in any various combinations and permutations to form any of the various embodiments of the inventive technology.

Figure 6:
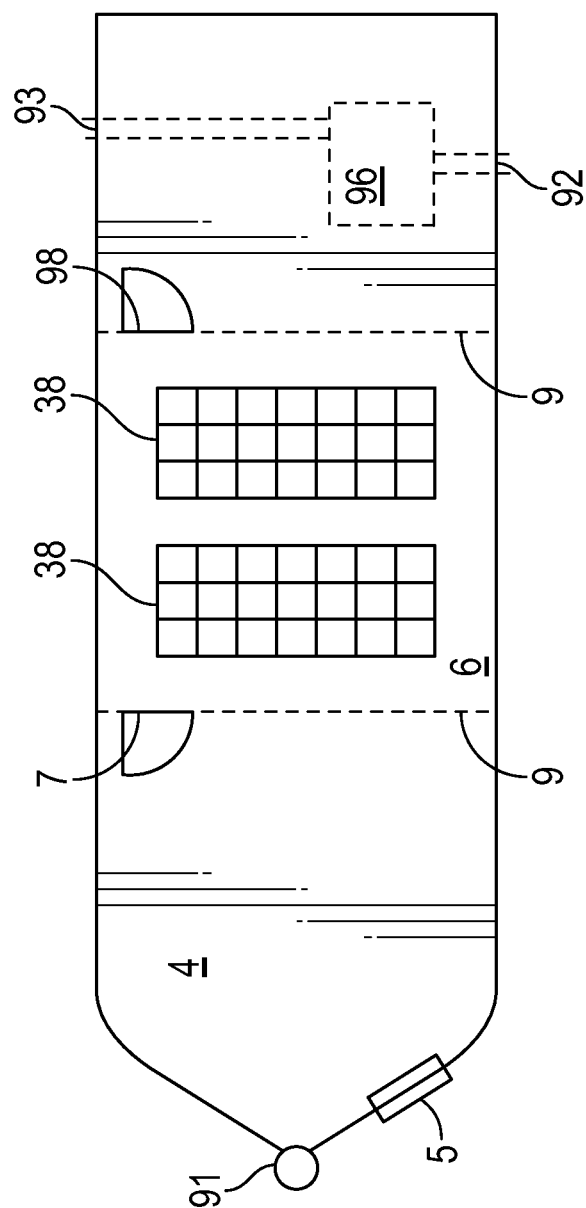
FIG. 6 shows a top view of an embodiment of the floating, enclosed, mobile emergency response unit as may appear in at least one embodiment of the inventive technology.

As mentioned, certain embodiments may be a floating unit. Such unit may be ramp free; instead of a ramped compartment it may have a pump compartment 90 (in addition to, e.g., a medical compartment 4 and an onboard equipment compartment 6). The pump compartment may house a "fixed" pump 96, which, while possibly portable in some embodiments, is expected to be established in fixed relation to the frame of the unit. There may be provided a pump suction port 92 and a pump discharge port 93, in certain embodiments (attached to the pump via hoses, as shown in FIG. 6). There may be provided a tow hitch 91 that facilitates towing of the unit behind a boat, to a jobsite where it may be moored (note that even in embodiments with a tow hitch, the unit itself may potentially be piloted, and as such may include a motor, propeller and rudder (and related componentry). In certain embodiments, one or more access doors (e.g., access door 5 to the medical compartment 4) may provide access to the floating unit; access to other compartments may be facilitated by doors in one or more internal partitions (partition door 7 that allows access to the onboard equipment compartment, and generally, partition access door 98). Any door of the floating unit, like any door of the land-based unit, can be of any type. Any configuration of doors that allow access to any compartment from outside of the unit, and partition doors, may be used. Note that, in certain embodiments, there may be provided access doors from outside to every compartment, and access doors in at least the partition separating the medical compartment (and possibly also the other partition); such may allow access to every compartment, given uncertain mooring orientations relative to floating structures to which the floating unit is moored. Note that, other than the ramp, virtually every feature indicated herein with regard to a mobile land unit can be used with regard to the floating unit. While compartments can be established in any relative configuration, a design where the (secured) onboard equipment compartment is not in the middle, and may help to facilitate access to the other two compartments (because, to get to and from the medical compartment and the pump compartment, one may need not travel through the often "crowded" (with equipment) onboard equipment compartment.

Note that embodiments of the inventive technology may be described as methods, e.g., methods of manufacturing, or methods of use. They may be described as the method versions of any apparatus (unit) embodiments explicitly described herein above. For example, any componentry (e.g., part or parts) that is established (e.g., located and/or situated) or configured in a manner described anywhere herein should be understood as providing support for establishing or configuring that componentry in that manner. Certain embodiments of the inventive method technology may be described as including the step of building an enclosure around heavy equipment that is first established on (and perhaps even first fastened to, but not necessarily) a mobile trailer. Certain embodiments of the inventive method technology may include the step of configuring an EMERU to prevent access (when the unit is on operational standby) to certain parts of an emergency response system(s) (e.g., a fire suppression system) with which human interfacing is not required during an emergency (e.g., such as pressurized fire suppression material storage tanks), while at the same time providing access (when the unit is on operational standby) to control componentry of that same emergency response system(s) with which human interfacing is required during an emergency (e.g., activation control componentry of the fire suppression system).

As can be easily understood from the foregoing, the basic concepts of the present invention may be embodied in a variety of ways. It involves both safety techniques as well as devices to accomplish that safety. In this application, the safety techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include within a 10% window centered on the indicated value or condition. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural units that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "installation" should be understood to encompass disclosure of the act of "installing"—whether explicitly discussed or not—and, conversely, were there effectively disclosure of the act of "installing", such a disclosure should be understood to encompass disclosure of an "installation" and even a "means for installing" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Provisional Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the safety products (e.g., loaded trailers) as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An enclosed, mobile emergency response unit comprising:
    an enclosure;
    an underlying support frame on which said enclosure is established;
    wherein said enclosure comprises:
        a medical compartment that is unsecured when said enclosed, mobile emergency response unit is on operational standby, said medical compartment having a medical compartment access door;
        a secured onboard equipment compartment that is secured when said enclosed, mobile emergency response unit is on said operational standby and during an emergency, said secured onboard equipment compartment secured with an onboard equipment compartment access door that is secured when said enclosed, mobile emergency response unit is on said operational standby and during said emergency;
        a ramped, portable equipment compartment that is configured to house portable equipment and that is unsecured when said enclosed, mobile emergency response unit is on said operational standby;
        a rear internal partition within said enclosure and a front internal partition within said enclosure that together divide said enclosure into said medical compartment, said secured onboard equipment compartment, and said ramped, portable equipment compartment, wherein said compartments are distinct compartments and are each human occupy-able;
        wherein said onboard equipment compartment access door is established in at least one of said internal partitions, and
        wherein said portable equipment housed in said ramped, portable equipment compartment comprises a portable, pneumatic, liquid waste transfer pump, said enclosed, mobile emergency response unit further comprising:
    a ramp configured so that said portable equipment can be moved up and down said ramp, so that said portable equipment can be moved into and out of said ramped, portable equipment compartment;
    a safety shower, automated external defibrillator, eye wash station, and first aid supplies that are established in said medical compartment;
    an air compressor established in said secured onboard equipment compartment and configured to power said portable, pneumatic, liquid waste transfer pump;
    air compressor control componentry that is in communication with said air compressor and established outside of said secured onboard equipment compartment;
    a solar power system that generates solar generated power, and comprises panels established atop said enclosure;
    a twin agent fire suppression system comprising onboard fire suppression equipment and fire suppression system control componentry in communication with said onboard fire suppression equipment, wherein:
        said onboard fire suppression equipment is established in said secured onboard equipment compartment, and
        said fire suppression system control componentry is established in a covered accessible area that is outside of said secured onboard equipment compartment, on an exterior of said enclosure, and accessible from outside of said enclosed, mobile emergency response unit, said covered accessible area covered with an openable cover that is unsecured when said enclosed, mobile emergency response unit is on said operational standby, said enclosed, mobile emergency response unit further comprising:
    ventilation componentry configured to vent said secured onboard equipment compartment;
    a diesel fueled electrical power generator established in fixed position relative to said underlying support frame and that generates electrical power;
    lighting established externally of said enclosure;
    at least one battery electrically connected with at least one of said solar power system and said diesel fueled electrical power generator;
    an operational monitoring and communication system comprising:
        at least one operational parameter monitor that monitors at least one operational parameter selected from the group consisting of battery charge, solar panel condition, fire suppression system pressure, and equipment operational time; and
        communication componentry that communicates said at least one operational parameter to at least one unit operator and comprises automatic action componentry that automatically provides a notification in the event said at least one operational parameter monitor detects equipment requiring attention:
    compressed air outlets connected with said air compressor and accessible from outside of said enclosed, mobile emergency response unit;
    a charging station electrically connected with at least one of said solar power system, said at least one battery, and said diesel fueled electrical power generator;
    wireless fidelity provision componentry established to provide wireless fidelity service from said enclosed, medical emergency response unit;

a diesel fuel tank configured to provide fuel to said diesel fueled electrical power generator and said air compressor; and a fuel port for said diesel fuel tank.

2. An enclosed, mobile emergency response unit as described in claim 1 wherein said ramp acts as a portable equipment compartment access door, and allows access to said ramped, portable equipment compartment when said ramp is deployed.

3. An enclosed, mobile emergency response unit as described in claim 1 wherein said enclosed, mobile emergency response unit is a mobile emergency response trailer.

4. An enclosed, mobile emergency response unit as described in claim 3 wherein said mobile underlying support frame comprises a wheeled underlying support frame.

5. An enclosed, mobile emergency response unit as described in claim 1 wherein said enclosed, mobile emergency response unit is a unit selected from the group consisting of: a wheeled towable unit, a haulable unit, a sleighed unit, and a flyable unit.

6. An enclosed, mobile emergency response unit as described in claim 1 wherein said underlying support frame comprises at least one axle, and said onboard fire suppression equipment and said air compressor are established substantially above said at least one axle.

7. An enclosed, mobile emergency response unit as described in claim 1 wherein said solar power system further comprises solar power electronics housed in said secured onboard equipment compartment.

8. An enclosed, mobile emergency response unit as described in claim 1 further comprising an additional accessible area that houses control componentry for said generator.

9. An enclosed, mobile emergency response unit as described in claim 1 further comprising fire detection cameras electrically connected with at least one of said solar power system, said at least one battery, and said fueled electrical power generator and configured to monitor a site for presence of fire.

10. An enclosed, mobile emergency response unit as described in claim 1 wherein said at least one battery is established in said secured onboard equipment compartment.

11. An enclosed, mobile emergency response unit as described in claim 1 wherein said diesel fuel tank is established in said secured onboard electrical equipment compartment.

12. An enclosed, mobile emergency response unit as described in claim 1 further comprising an air quality monitor established to monitor quality of air outside of said enclosed, mobile emergency response unit.

13. An enclosed, mobile emergency response unit as described in claim 1 wherein said air compressor control componentry is established in an accessible area that is unsecured when said enclosed, mobile emergency response unit is in operational standby.

14. An enclosed, mobile emergency response unit as described in claim 13 wherein said covered accessible area in which said fire suppression system control componentry is established is distinct from said accessible area in which said air compressor control componentry is established.

15. An enclosed, mobile emergency response unit method comprising the steps of:

establishing an enclosure atop and connected with an underlying support frame;

establishing, as part of said enclosure:

a medical compartment that is unsecured when said enclosed, mobile emergency response unit is on operational standby, said medical compartment having a medical compartment access door;

a secured onboard equipment compartment that is secured when said enclosed, mobile emergency response unit is on said operational standby, and during an emergency, said secured onboard equipment compartment secured with an onboard equipment compartment access door that is secured when said enclosed, mobile emergency response unit is on said operational standby and during said emergency;

a ramped, portable equipment compartment that is configured to house portable equipment and that is unsecured when said enclosed, mobile emergency response unit is on said operational standby, said ramped, portable equipment compartment having a portable equipment compartment access door;

internal partitions within said enclosure that divide said enclosure into said medical compartment, said secured onboard equipment compartment, and said ramped, portable equipment compartment, wherein said compartments are distinct compartments and are each human occupy-able;

said enclosed, mobile emergency response unit method further comprising the steps of:

configuring a ramp so that said portable equipment can be moved up and down said ramp so that said portable equipment can be moved into and out of said ramped, portable equipment compartment;

establishing a safety shower, automated external defibrillator, and first aid supplies in said medical compartment; and establishing onboard fire suppression equipment in said secured onboard equipment compartment;

establishing fire suppression system control componentry in an accessible area that is outside of said secured onboard equipment compartment and that is unsecured when said enclosed, mobile emergency response unit is on said operational standby, and establishing said fire suppression system control componentry in communication with said onboard fire suppression equipment;

said enclosed, mobile emergency response unit method further comprising the steps of:

establishing an air compressor in said secured onboard equipment compartment;

establishing air compressor control componentry outside of said secured onboard equipment compartment;

configuring ventilation componentry to vent said secured onboard equipment compartment;

establishing a fueled electrical power generator in fixed position relative to said underlying support frame;

establishing lighting externally of said enclosure; and electrically connecting at least one battery with at least one of said solar power system and said fueled electrical power generator.

16. An enclosed, mobile emergency response unit method as described in claim 15, wherein said portable equipment comprises a portable, pneumatic, liquid waste transfer pump, and further comprising the step of configuring said air compressor to power said portable, pneumatic, liquid waste transfer pump.

* * * * *